No. 785,701. PATENTED MAR. 28, 1905.
J. G. ANDREU.
WRAPPER PASTING DEVICE.
APPLICATION FILED JAN. 30, 1904.

Joseph G. Andreu,
Inventor.

Witnesses

No. 785,701. Patented March 28, 1905.

UNITED STATES PATENT OFFICE.

JOSEPH GALIBRY ANDREU, OF JACKSONVILLE, FLORIDA.

WRAPPER-PASTING DEVICE.

SPECIFICATION forming part of Letters Patent No. 785,701, dated March 28, 1905.

Application filed January 30, 1904. Serial No. 191,390.

*To all whom it may concern:*

Be it known that I, JOSEPH GALIBRY ANDREU, a citizen of the United States, residing at Jacksonville, in the county of Duval and State of Florida, have invented a new and useful Wrapper-Pasting Device, of which the following is a specification.

This invention relates to devices for applying paste to the edges of wrappers; and it has for its object to provide a device of this class which shall be simple in construction and efficient in operation and by means of which paste may be applied to the edges of wrappers in a simple and economical manner.

The invention consists in the improved construction, arrangement, and combination of parts, which will be hereinafter fully described, and particularly pointed out in the claims.

In the accompany drawings have been shown simple and preferred forms of embodiment of my invention, it being understood, however, that I do not limit myself to the structural details therein exhibited, but reserve the right to such changes and modifications as may fairly come within the scope of my invention and which may be resorted to without departing from the spirit or sacrificing the utility of the same.

Figure 1:
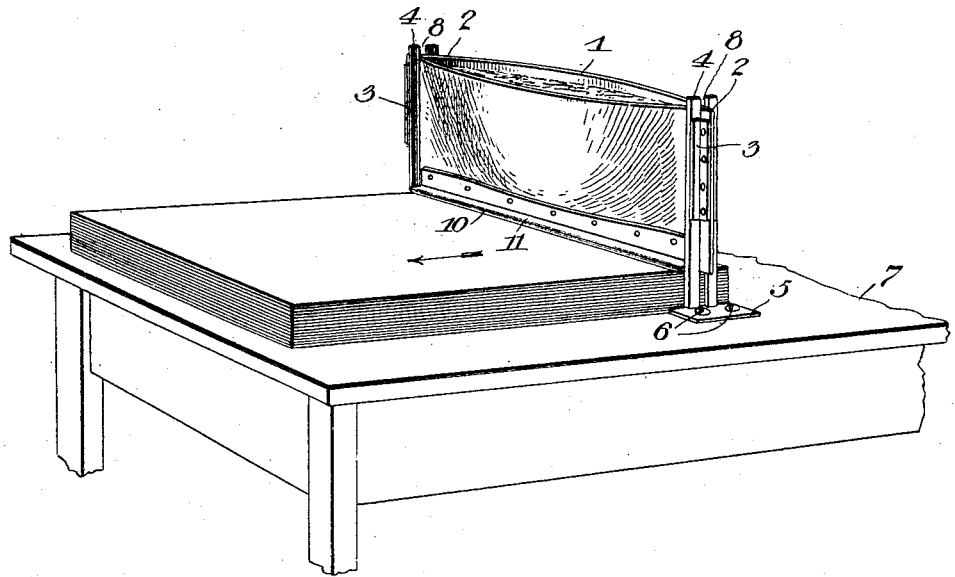
Figure 2:
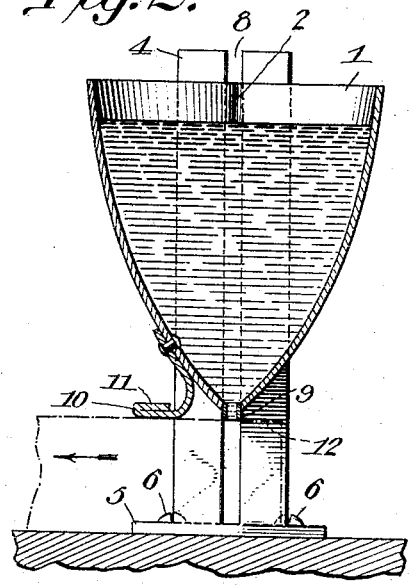
Figure 3:
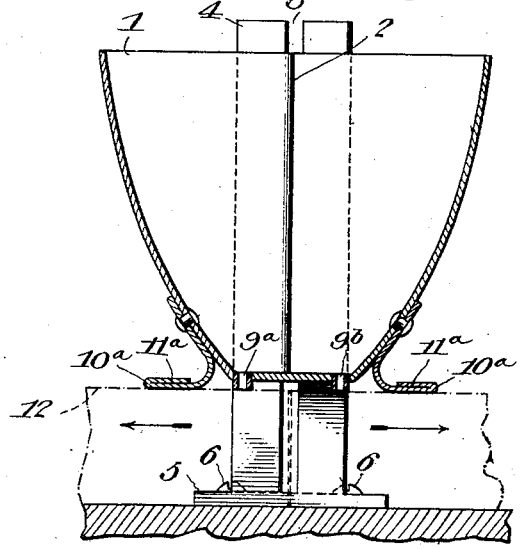

In said drawings, Figure 1 is a perspective view showing my invention in operative position. Fig. 2 is a longitudinal sectional view. Fig. 3 is a sectional detail view illustrating a modification.

Corresponding parts in the several figures are indicated by similar numerals of reference.

In carrying out my invention I provide a paste-receptacle 1, which is preferably of oblong shape with pointed ends, as 2 2, said receptacle being provided at the ends thereof with vertical flanges 3 3.

4 4 are a pair of vertically-slotted uprights provided at their lower edges with flanges 5, perforated for the reception of screws 6 or similar fastening means, whereby they may be mounted in operative position upon a table or bench 7. When said uprights are thus mounted, the ends 2 of the paste-receptacle are fitted to slide in the slots 8 of the uprights 4, the flanges 3 3 upon the ends of said paste-receptacle abutting upon the outer sides of the uprights, with which the paste-receptacle is thus connected to slide vertically. The slots 8 are open at their outer ends to admit of the paste-receptacle being detached from the uprights when desired.

The paste-receptacle is provided in the bottom thereof with a plurality of short tubes 9, placed closely together and extending through the bottom of the receptacle for the escape of the liquid contents of the latter. Upon the front side of the receptacle is secured a spreader 10, which may be of metal or other suitable material and the lower portion of which is bent upon itself, as shown at 11, the under side of the portion thus bent being disposed on a level with the lower ends of the tubes 9, the length of which latter need not exceed one-sixteenth of an inch.

In operation the paste-containing vessel is raised between the uprights or guides, and a stack of wrappers, as shown at 12, is placed under the same, the edges of the wrappers being sufficiently projected in rear of the escape-tubes 9, which latter when the paste-receptacle is lowered will rest upon the uppermost wrapper. Liquid paste contained in the receptacle will thus be permitted to escape through the tubes 9 in sufficient quantity, the flow being stopped by contact with the uppermost wrapper. When the latter is withdrawn, the paste deposited thereon will be properly diffused by the spreader 10, and any surplus paste will also be removed by the action of the latter and deposited upon the subjacent wrapper. Each wrapper will thus when removed from the stack be properly pasted to enable its edge to be secured in the usual and well-known manner.

In the modified form of my invention illustrated in Fig. 3 the paste-receptacle is provided with a wider bottom than in the form illustrated in Figs. 1 and 2 and is provided with two rows of tubes $9^a$ and $9^b$. A spreader $10^a$, having a bent lower edge $11^a$, is also secured to each side of the paste-receptacle. By this construction two stacks of wrappers may be placed under a single paste-receptacle, both stacks being supplied with paste from the single receptacle. This form enables two operators to work simultaneously, one being stationed at either side of the device, which in this instance will be mounted centrally upon a suitable table or bench.

From the foregoing description the operation of my invention will be readily understood. The device is simple in construction and is automatic in its operation to the extent that it is lowered by gravity as fast as wrappers are removed from the stack, thus maintaining it always in operative position. The spreaders in addition to serving as such also serve to assist in maintaining the stack of wrappers in the desired position without liability of being accidentally displaced. By using the escape-tubes as herein described the liquid paste or adhesive will be distributed and there will be little liability of waste or of overflow.

Having thus described my invention, I claim—

1. In a device of the class described, a pair of slotted uprights, and a paste-receptacle having ends extended into the slots in said uprights and flanges abutting upon the outer sides of the latter.

2. In a device of the class described, a vertically-movable paste-receptacle having a plurality of escape-tubes extending through the bottom thereof, and a spreader attached to the receptacle in front of said tubes, the lower edge of said spreader being level with the lower edges of said tubes.

3. In a device of the class described, a vertically-movable paste-receptacle having escape-openings in the bottom thereof, and a spreader attached to said receptacle and having a forwardly-bent lower end, the under side of the bent portion of said spreader being level with the lower edges of the escape-openings.

4. In a device of the class described, a pair of uprights having vertical slots open at their upper ends, a paste-receptacle having tapering ends extended into said slots and flanges abutting exteriorly upon said uprights, escape-tubes in the bottom of said receptacle, and spreading means attached to the latter, the lower edges of said spreading means being level with the lower ends of the tubes.

In testimony that I claim the foregoing as my own I have hereto affixed my signature in the presence of two witnesses.

JOSEPH GALIBRY ANDREU.

Witnesses:
   W. H. AVERY,
   A. B. CAMPHYOHN.